Figure 1:
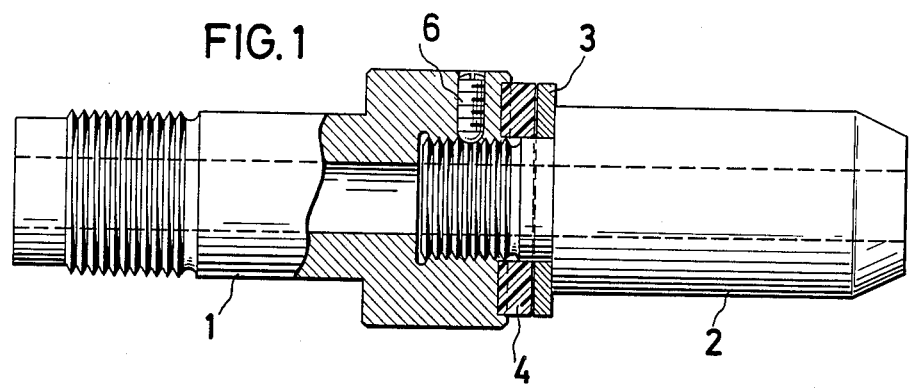

United States Patent [19]

Neumann et al.

[11] Patent Number: 4,767,310
[45] Date of Patent: Aug. 30, 1988

[54] BLOW MANDREL FOR EXTRUSION BLOW MOLDING WITH AGRESSIVE BLOW MEDIA

[75] Inventors: Horst Neumann, Kelkheim; Manfred Busch, Sulzbach, both of Fed. Rep. of Germany

[73] Assignee: Hoechst Aktiengesellschaft, Fed. Rep. of Germany

[21] Appl. No.: 30,456

[22] Filed: Mar. 25, 1987

[30] Foreign Application Priority Data

Mar. 27, 1986 [DE] Fed. Rep. of Germany ....... 3610389

[51] Int. Cl.⁴ .............................................. A01J 21/00
[52] U.S. Cl. ..................................... 425/469; 425/535;
285/355; 285/90
[58] Field of Search ............... 425/535, 522, 538, 469,
425/528–530; 285/90, 89, 92, 333, 334, 354,
355, 404, 910, 390; 277/DIG. 6

[56] References Cited

U.S. PATENT DOCUMENTS

| 904,673 | 11/1908 | Bideker | 285/90 |
|---|---|---|---|
| 1,138,946 | 5/1915 | Elliot | 285/354 |
| 1,218,359 | 3/1917 | Beatty | 285/334 |
| 1,393,057 | 10/1921 | Vollmer | 285/92 |
| 2,329,876 | 9/1943 | Castellano | 285/90 |
| 3,873,660 | 3/1975 | Reilly | 425/529 |

FOREIGN PATENT DOCUMENTS

| 1947525 | 4/1971 | Fed. Rep. of Germany . |
|---|---|---|
| 1704162 | 2/1972 | Fed. Rep. of Germany . |
| 2300115 | 7/1973 | Fed. Rep. of Germany . |
| 2426198 | 12/1975 | Fed. Rep. of Germany . |
| 874238 | 8/1961 | United Kingdom ............... 285/355 |

*Primary Examiner*—Bernard Nozick
*Attorney, Agent, or Firm*—Connolly and Hutz

[57] ABSTRACT

Escape of the blow medium at the blow mandrel/HDPE contact surface is prevented during extrusion blow molding of HDPE with an aggressive blow medium if a blow mandrel with a movable sealing element is used.

4 Claims, 1 Drawing Sheet

BLOW MANDREL FOR EXTRUSION BLOW MOLDING WITH AGRESSIVE BLOW MEDIA

The fluorination of hollow articles of HDPE is a process for reducing the permeation of organic solvents and engine fuels. The fluorination is carried out either in the form of an aftertreatment on the finished blown hollow article (off-line fluorination) or during the blowing operation during production of the hollow article (in-line fluorination), an $F_2/N_2$ mixture being used as the blow medium instead of air or an inert gas in the known blow molding process.

In blow molding of hollow articles, the blow mandrel is first inserted into the polyethylene tube accommodated by the shaping mold through the opening of the parison and the parison is then blown up, cooled and released from the mold.

The blow mandrel gives the molten HDPE tube in the mold the desired shape on the inside in the region of the opening of the hollow article and at the same time stamps the final upper edge of the hollow article. When the mandrel has been immersed and the PE tube is still thermoplastic, plastic, the blow mandrel/polyethylene contact surface is perhaps still gas-tight. Because of the cooling of the polyethylene, which takes place particularly rapidly due to the contact with the metallic mandrel, the polyethylene material shrinks and the blow medium flows out between the mandrel surface and the opening of the blown hollow article.

If air is used as the blow medium, it is not necessary for the passage from the blow mandrel to the polyethylene tube in the mold and the resulting polyethylene hollow article to be gas-tight. In order to cool the blown article in the mold as rapidly as possible, it is even desirable for some of the blow air to escape while maintaining the required blowing pressure. When blow molding with gas mixtures which contain aggressive constituents, however, it is necessary for the passage from the blow mandrel to the plastic to be closed gas-tight. Otherwise, some of the gas mixture would escape unused into the surrounding air. Not only are manufacturing costs thereby increased, but damage to equipment due to increased corrosion is also to be expected. In addition, the aggressive constituents of the gas mixtures harm the environment.

It has now been found that the blow mandrel/polyethylene contact surface can be kept gas-tight throughout the entire duration of the blowing operation if a blow mandrel with a moving sealing element is used.

The invention thus relates to the blow mandrel described in the claims.

The blow mandrel according to the invention consists of two parts, a cylindrical part which is inserted into the polyethylene parison, and a part with a thread, with which the blow mandrel is attached to the hollow article blow molding device. Both parts can in general be separated, but can also form a single piece. The moving sealing element is located between the two parts.

The moving sealing element is an annular body which encircles the cylindrical part of the blow mandrel and can slide backwards and forwards on it. The sealing element can be either a ring or a shell. The surface facing the parison to be blown up is flat and the cross-section is in general rectangular, a shell being provided with a strengthening piece gripped by a union nut so that the shell does not fall off. Depending on the nature of the aggressive blow medium, the sealing element consists of a resistant metal, for example copper, brass or bronze, and in the case of blow media containing $F_2$ preferably copper. The dimensions of the sealing element depend on the size of the blow mandrel, which in turn depends on the nature and size of the hollow article to be produced.

The sealing element is pressed by a spring element against the parison to be blown up. The spring element can be a plate spring, but is preferably a molded article of an elastomer which is resistant towards the aggressive blow medium, for example of a fluorinated rubber in the case of a fluorine-containing blow medium. The dimensions and spring properties of the spring element depend on the dimensions of the sealing element.

Figure 2:
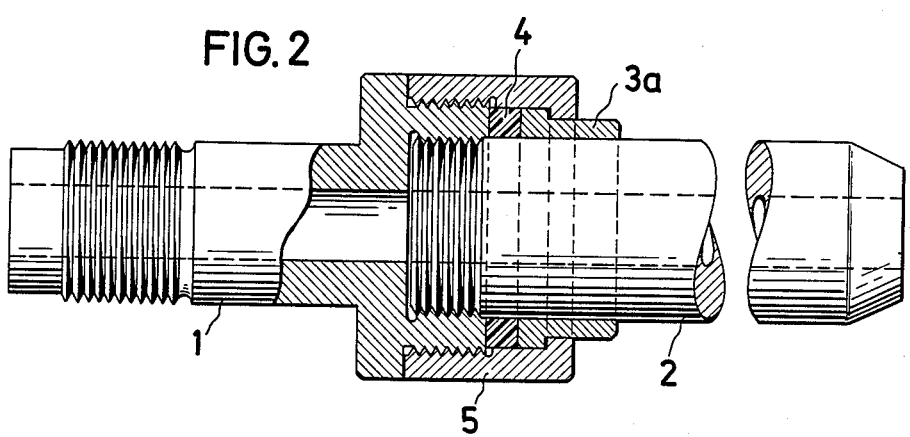

FIGS. 1 and 2 show two embodiments of the blow mandrel according to he invention in part view and part longitudinal section.

The blow mandrel according to FIG. 1 consists of a part (1) which has a thread for attaching to the hollow article blow molding device, which is not shown, and a cylindrical part (2), which plunges into the parison. The two parts are joined to one another by a thread. On the side of part (2) facing the rear part (1) is the annular sealing element (3) of copper located movably on a taper. The spring element (4), a ring of fluorinated rubber, is attached behind this. The sealing element (3) and spring element (4) are held in their position by the screwed-together blow mandrel parts (1) and (2). The screw connection can be secured by a grub screw (6).

The blow mandrel according to FIG. 2 is an improved form of the blow mandrel according to FIG. 1. This blow mandrel is also in two parts and consists of part (1) and the cylindrical part (2), but it could just as easily consist of a single piece in the present case. The moving sealing element (3a) surrounds the cylindrical part (2) as a copper shell and is held fast by the union nut (5). The spring element (4) again consists of a fluorinated rubber.

When the blow mandrel is plunged into a parison which has not yet been blown up, the sealing element lies on the upper opening of the parison and presses the excess polyethylene to the side. The shrinkage which takes place on cooling of the hollow article results in the spring element continuing to press the sealing element onto the upper opening of the hollow article. It has been found that the blow mandrel/polyethylene contact surfaces remain gas-tight even under a blowing medium pressure of 5 bar.

The blow mandrel according to the invention can be used when various aggressive blow media are employed. Possible blow media are those which, in addition to air or an inert gas, contain, for example, $Cl_2$, $F_2$, $ClF_3$ or $ClF_6$.

What is claimed is:

1. A blow mandrel for extrusion blow molding of a parison with a blow medium comprising a generally cylindrical structure including a cylindrical first piece having a parison engaging end and an internal passageway extending therethrough for passage of a blow medium, the structure also including a second piece with an internal passageway extending therethrough for passage of a blow medium and a threaded connection between the first and second pieces for releasably connecting them together, an outwardly extending annular sealing element lonitudinally movable on the outside of the cylindrical structure spaced from the parison engaging end of the cylindrical first piece and constructed and arranged to sealingly engage a parison when the engaging end of the cylindrical first piece is inserted into the parison for blow molding thereof, and a spring element, next to the sealing element between the pieces urging the sealing element and forming part of the connection.

2. A blow mandrel as in claim 1 wherein the sealing element comprises a ring having a generally rectangular cross-section.

3. A blow mandrel as in claim 1 wherein the sealing element comprises a cylindrical shell.

4. A blow mandrel as in claim 1 wherein the spring element is molded of fluorinated rubber elastomer resistant to the blow medium.

* * * * *